3,808,303
ETHER TREATMENT OF NITROGEN-CONTAINING POLYMER MEMBRANES

James Barry Ganci and James Henry Jensen, Wilmington, Del., and Farren Hullum Smith, Waynesboro, Va., assignors to E. I. du Pont de Nemours and Company, Wilmington, Del.
No Drawing. Filed Dec. 30, 1971, Ser. No. 214,404
Int. Cl. B29d 27/04; B01d 39/16
U.S. Cl. 264—41                                    12 Claims

ABSTRACT OF THE DISCLOSURE

The solute rejection properties of permselective membranes made of nitrogen-linked synthetic organic polymers in reverse osmosis processes are improved by exposing the membranes to solutions of ethers having carbon to oxygen atomic ratios between about 2.5:1 and about 5:1, and having formula weights larger than about 400. Such treatments are even more effective when combined with exposure of the membranes to water at temperatures of 50° C. to 90° C.

BACKGROUND OF THE INVENTION

(1) Field of the invention

This invention relates to membranes for the selective permeation separation of the components of liquid mixtures. More particularly, this invention is directed to methods for improving the properties of reverse osmosis membranes prepared from particular synthetic organic nitrogen-linked aromatic polymers by treating such membranes with ethers, optionally in combination with exposure to hot water.

(2) Description of the prior art

Permselective membranes which preferentially permeate certain components of liquid mixtures while retaining other components, have long been known, as has the principle of reverse osmosis, wherein a hydrostatic pressure in excess of the equilibrium osmotic pressure of a liquid mixture is applied to the mixture to force the more permeable components of the mixture, usually water, through the membrane in preference to the less permeable components, usually a salt, contrary to normal osmotic flow. Recent research in this field has been directed primarily toward the development of membranes for the reverse osmosis desalination of brackish and sea waters on a practical scale.

It is well-known that complete separation of the more permeable from the less permeable components of liquid mixtures is never obtained with permselective membranes in practical use. All components of a mixture permeate to some degree through any membrane which has a practical permeation flux rate for the more permeable components. In general, membranes of any particular type can be prepared with a range of flux rates, the membranes having higher flux rates and correspondingly lower rejection efficiencies for the less permeable components. A principal goal with such membranes has been the production of membranes with economically attractive optimum balances of high flux rates for more permeable components and high rejection efficiencies for less permeable components of liquid mixtures.

One technique used in the prior art to obtain reverse osmosis membranes with more economically attractive balances of water flux rate and salt rejection has been to expose a preformed membrane to water at a temperature above the temperature of expected use, usually in the range of about 70° C. to about 95° C. This technique is described for example in U.S. Pat. 3,446,359, and is commonly used in the commercial production of cellulose acetate reverse osmosis membranes.

Another prior art technique for obtaining reverse osmosis membranes with a more attractive balance of water flux rate and salt rejection efficiency has been to expose a preformed membrane to a water solution of a material which changes the permselective properties of the membrane. Thus Martin describes in U.S. Pat. 3,373,056 processes in which cellulose acetate membranes are exposed to aqueous solutions of poly(vinyl methyl ether) for this purpose.

However, such treatments are shown to produce only temporary improvement in cellulose acetate membranes. Thus Lonsdale et al. report in Research and Development Progress Report No. 447 (July 1969) of the Office of Water Quality and Research, U.S. Department of the Interior, at page 67, that much of the beneficial effect of exposure of a heat-treated cellulose acetate membrane to a salt solution containing 100 parts per million of poly-(vinyl methyl ether) disappeared after as little as 64 hours of subsequent exposure of the membrane to a salt solution and conclude that poly(vinyl methyl ether) is of limited value in treating cellulose acetate membranes.

Similarly, Subcasky et al. report in Research and Development Progress Report No. 466 (October 1969) at pages 56 to 58, 126 and 128 that exposure of cellulose acetate membranes to salt solutions containing as little as 10 parts per million of poly(vinyl methyl ether) under reverse osmosis conditions can produce membranes with more desirable balances of water flux rate and salt rejection, but that (1) the beneficial effect of the additive is lost during the reverse osmosis desalination of salt solutions, (2) the membranes show a higher rate of decline of water flux rate during continuous treatment than do similar untreated membranes, and (3) depressurizing the membranes eliminates the improvement imparted by the additive treatment.

Some reaction products of ethylene oxide have also been tried as treating agents for cellulose acetate reverse osmosis membranes. Vos et al. reported in Research and Development Progress Report No. 348 (November 1967) and in Industrial and Engineering Chemistry Product Research and Development, volume 8, pages 84 to 89 (1969) that cellulose acetate membranes can be dried and rewet without loss in desalination properties after soaking in aqueous solutions of a variety of surface active agents, including "Sterox" DJ, a dodecyl phenoxy polyethoxyethanol (10 moles of ethylene oxide); "Tergitol" 15S7, poly-oxyethylene (9 moles of ethylene oxide) substituted on an 11-carbon to 15-carbon linear alkyl structure; "Triton" X–100, isooctyl-phenoxy polyethoxyethanol (10 moles of ethylene oxide); and "Lutanol" M40, poly(vinyl methyl ether). However consistent improvement in salt rejection was not shown and permanence of efficiency was not considered. Also Subcasky et al. in Research and Development Progress Report No. 466 (mentioned above) and Subcasky in Research and Development Progress Report No. 532 (June 1970) at pages 78, 79, 82, 83 and 91 reported that certain polyoxyethylene-nonylphenols are effective in increasing the salt rejection of cellulose acetate reverse osmosis membranes without corresponding reductions in water flux rates. However, no lasting improvement was shown for such treatment and a problem was observed in incomplete rejection of some of the treating agents permitting passage of those agents into the permeated produced water.

It is an object of this invention to provide a treatment for nitrogen-containing polymer membranes which imparts improved solute-rejection properties to the membrane. It is a further object of this invention is provide a treatment for such membranes which imparts a long-lasting improvement in membrane efficiency. It is a further object of this invention to provide a treatment for such membranes which imparts improvements that are not diminished by subsequent depressurization of the membrane. These and other objects are attained by this invention as described and illustrated hereinafter.

SUMMARY OF THE INVENTION

In summary, this invention is directed to a method for improving solute rejection efficiency of a membrane of a substantially linear, aromatic, synthetic, organic, nitrogen-linked polymer having the formula

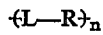

wherein (i) each —L— group as it occurs in the polymer chain is independently a linking group and at least about 50 percent of the —L— groups contain a nitrogen atom in the polymer chain;
(ii) each —R— group as it occurs in the polymer chain is independently an organic radical and at least about 50 percent of the —R— groups consist essentially of a 5-member or a 6-member ring subject to resonance bonding; and
(iii) the degree of polymerization is defined by $n$, an integer sufficiently large to provide film-forming molecular weight;

said method comprising contacting the membrane with an effective amount of an ether having a formula weight greater than 400 and a ratio of carbon atoms to oxygen atoms between about 2.5:1 and about 5:1.

The method of this invention optionally includes the step of heating the membrane in water or an aqueous mixture at a temperature between about 50° C. and about 90° C. for a time sufficient to reduce the salt passage therethrough.

DESCRIPTION OF THE INVENTION

The polymeric permselective membranes of this invention can be in any of several forms, such as thin coatings on porous substrates, thin films supported by porous substrates, thin-walled hollow fibers, etc. The porous substrates in turn can be shaped as tubes supporting either internal or external membranes, as flat plates, as corrugated sheets, etc., all as known in the prior art.

As used herein, the term "permselective" has the usual denotation of the ability to preferentially permeate one or more components of a liquid mixture while simultaneously restraining permeation of one or more other components. The flux rates of permselective membranes are conveniently expressed in terms of the quality of a component of the feed mixture which permeates in a given time through a membrane of a given size under a specified pressure. For practically useful reverse osmosis membranes, the water flux rate can be defined as the number of gallons of water passing through one square foot of membrane surface per day under a given applied pressure. The effective membrane surface area is the total area of the membrane exposed to the feed mixture under pressure. For the purposes of the present invention, which is primarily concerned with aqueous solution separations, a membrane is considered to be permselective when it exhibits a water permeability of at least 0.15 gallons per square foot per day under reverse osmosis conditions with a pressure of 600 pounds per square inch gauge and exhibits also a solute passage of less than 20 percent.

The flux rates of permselective membranes frequently decrease with time according to a log-log relationship of the type $$\log (X) = \log (A) - B \log (T)$$

in which X is the flux rate at time T, A is the flux rate after the initial time interval, and B is a measure of the rate of decline of flux with time. This equation can be written for reverse osmosis membranes in the form $$\log GFD = \log GFD_1 - B \log (days)$$

in which GFD is the water flux rate in gallons per square foot per day after a given number of days under a specified applied pressure, $GFD_1$ is the calculated or observed water flux rate after one day, and B is the coefficient of water flux rate decline. A membrane with a low value for the coefficient B can be economically useful for a longer period of time than another similar membrane even though the similar membrane has a higher initial flux rate.

As used herein, the term "reverse osmosis" applied particularly to those permselective membranes and processes wherein the solute to be preferentially rejected is a dissociated salt, such as sodium chloride, sodium sulfate, and calcium chloride, and the salt is preferentially rejected from an aqueous solution while water passes through the membrane counter to the normal osmotic direction of flow under the influence of a pressure greater than the osmotic pressure of the solution. Permselective membranes are also used in such processes as dialysis and ultra-filtration.

The solute rejection efficiencies of reverse osmosis membranes are conveniently expressed in terms of the percentage of the salt in the feed mixture which is passed by the membrane, calculated by the equation $$\text{Percent salt passage} = \frac{\text{salt concentration in permeate}}{\text{salt concentration in feed}} \times 100$$

Permeation membranes desirably have high flux rates for one or more components of the mixture separated and high rejection efficiencies for one or more other components. The improved membranes of this invention have higher solute rejection efficiencies, shown by a lower percentage of solute passage, than similar membranes not treated by the processes described herein. The improved solute rejection efficiencies of these improved membranes are maintained for long times during use of the membranes in permselective processes and are unaffected by depressurizing the membranes after exposure to reverse osmosis conditions.

(1) Polymers

The membranes suitable for use in this invention are made of one or more substantially linear aromatic synthetic organic nitrogen-linked condensation polymers of the general formula

in which (i) each —L— group, as it occurs along the polymer chain, is independently a linking group,
(ii) each —R— group, as it occurs along the polymer chain, is independently an organic radical,
(iii) the degree of polymerization is indicated by $n$, an integer sufficiently large to provide film-forming molecular weight, and the terminal groups of the polymer chains are not defined.

By the term "independently" is meant that each —L— or —R— group may be the same as or different from each other —L— or —R— group along the same polymer backbone chain.

"Condensation polymers" contain a backbone chain composed of alternating —L— groups and —R— groups which is formed by a condensation polymerization reaction as contrasted to a free-radical polymerization reaction. Polymers are useful which have molecular weights of sufficient magnitude so that they are film-forming or fiber-forming and have a non-tacky surface at room temperature when dry. Polymers with an inherent viscosity above about 0.6 are useful and polymers whose inherent viscosity is between about 0.8 and about 3.0 are preferred.

"Nitrogen-linked" polymers contain nitrogen atoms in the polymer chain as linking parts of at least about 50 percent of the —L— groups. They can also contain other nitrogen atoms either as part of or attached to the —R— groups. Any remaining linking groups can be other functional groups formed by condensation reactions, such as ether and ester groups.

"Synthetic organic" polymers are "man-made" in the usual connotation and are composed substantially of carbon, hydrogen, oxygen, nitrogen, and sulfur. These polymers can also contain minor amounts of other atoms.

"Aromatic" polymers are polymers in which at least about 50 percent of the —R— groups contain 5-membered or 6-membered ring system subject to resonance bonding and which can contain hetero atoms such as oxygen and nitrogen.

"Substantially linear" polymers exhibit the general solubility and melting properties characteristic of linear polymers as contrasted to highly cross-linked polymers but can contain minor amounts of cross-linked and chain-branched structures.

The perselective membranes useful in accordance with this invention can be composed of polymers containing repeated ${L—R}_n$ units of a single type or of polymers containing repeated units of two or more different types. Repeat unit of different types may result from the presence of different —L— groups, from the presence of different —R— groups, or from both. When the polymers contain different —L— groups and different —R— groups, they can be in an ordered sequence or in a more or less random sequence. The membranes can also be composed of compatible physical mixtures of polymers of any of the above-described types.

(a) Linking groups: The —L— groups in the general formula ${L—R}_n$ are independently chosen so that at least 50 percent of the —L— groups in each polymer backbone chain contain at least one of each of the structures

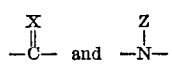

in any sequence such that no one structure of either of these types is adjacent to more than one other structure of the same type. It should be understood that the structures of the linking groups recited herein are given without regard to the direction in which the structures are read; that is, these linking groups can appear both as recited and as the reverse structure in a single polymer chain.

In one class of polymers useful in membranes of this invention, each "X" in the

structure can be independently oxygen or sulfur, and is preferably oxygen, and each "Z" in the

structures can be independently hydrogen, a one to four carbon alkyl, or phenyl and preferably at least one-fourth of all the "Z's" are hydrogen. Typical examples of —L— groups of this class of polymers are (a)
$$-\overset{O}{\underset{\|}{C}}-\overset{H}{\underset{|}{N}}-$$
(the amide group)

(b)
$$-\overset{O}{\underset{\|}{C}}-\overset{O}{\underset{\|}{C}}-\overset{H}{\underset{|}{N}}-$$
(the oxamide group)

(c)
$$-\overset{O}{\underset{\|}{C}}-\overset{H}{\underset{|}{N}}-\overset{H}{\underset{|}{N}}-$$
(the acyl hydrazide group)

(d)
$$-\overset{O}{\underset{\|}{C}}-\overset{H}{\underset{|}{N}}-\overset{H}{\underset{|}{N}}-\overset{O}{\underset{\|}{C}}-$$
(the diacyl hydrazide group)

(e)
$$-\overset{H}{\underset{|}{N}}-\overset{O}{\underset{\|}{C}}-\overset{H}{\underset{|}{N}}-\overset{H}{\underset{|}{N}}-$$
(the semicarbazide group)

Preferred polymers of this class contain the amide and diacyl hydrazide groups as —L— groups. In other polymers of this class, the —L— groups can be of the structure

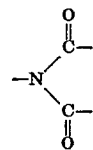

in which the fourth valences of the carbonyl carbon atoms are linked vicinally to an aromatic ring in the polymer chain structure so that the complete unit forms an imide structure of the type

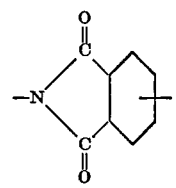

In preferred polymers of this type, two such units are combined in a structure of the type

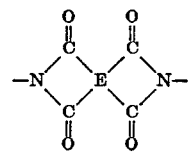

in which E is a tetravalent aromatic radical which can be a monocarbocyclic, monoheterocyclic, fused carbocyclic, or fused heterocyclic radical or of the formula

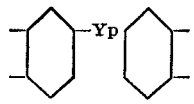

in which p is zero or one and Y is a divalent radical such as —CO—, —O—, —S—, —SO$_2$—, —NH—, and lower alkylene.

In another class of polymers useful in membranes of this invention, each

structure in the —L— groups can be a

group in which the third valence of the nitrogen atom is linked to an aromatic ring which is also separated from the

group in the polymer chain by an

structure linked to the aromatic ring vicinally to the

structure so that the complete unit forms a benzimidazole structure of the type

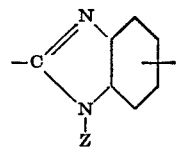

In the preferred polymers of this type, two such units are combined in a structure of the type

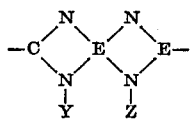

in which Z and E are radicals as defined above.

(b) Organic radical groups: The organic radical —R— groups in the general formula (L—R)$_n$ are independently chosen so that at least about 50 percent of the groups in each polymer backbone chain are aromatic radicals which can be monocarbocyclic, monoheterocyclic, fused carbocyclic, or fused heterocyclic or of the formula

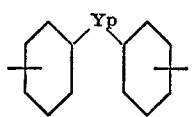

in which p is zero or one and Y is a divalent group as defined above. These aromatic radicals can be unsubstituted or can have substituents which do not change the fundamental characteristics of the polymer. The preferred substituent is the sulfonic acid group.

Any remaining —R— groups can be saturated aliphatic, carbocycloaliphatic or heterocycloaliphatic radicals with non-vicinal points of attachment or alkylene radicals having less than about six carbon atoms between points of attachment.

Preferably the membranes useful as taught herein are made of polymers which contain two or more different phenylene —R— groups. A particularly preferred class of polymers are those in which about 50 to 90 percent of the —R— groups are meta-phenylene groups and about 10 to 50 percent of the —R— groups are other than metaphenylene.

(c) Polymer preparation: Aromatic polyamides suitable for use in membranes of this invention are characterized by the recurring structural group

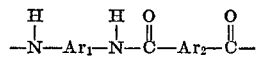

in the polymer chain, where Ar$_1$ and Ar$_2$ are substituted or unsubstituted divalent aromatic radicals wherein the chain-extending bonds are oriented meta or para to each other and any substituents attached to the aromatic nucleus are not condensed with reactants during polymerization. Included are the polymers described in Kwolek et al. in U.S. Pat. 3,063,966. Wholly aromatic film- and fiber-forming polyamides of this structure can be generally prepared by the condensation of one or more aromatic diamines with one or more aromatic diacid dihalides as described by Hill et al. in U.S. Pat. 3,094,511, by Preston in U.S. Pats., 3,232,910 and 3,240,760, in British Pat. 1,104,411, and by P. W. Morgan in Condensation Polymers, Polymer Review, vol. 10, Interscience Publishers, New York (1965); by self-condensation of one or more aromatic amino acid chlorides as described in French Pat. 1,526,745; or by reacting one or more aromatic amino acid chlorides with one or more aromatic diamines and then reacting the resulting intermediate with one or more dibasic acid chlorides. Preferably the polyamide has an inherent viscosity of about 1 to 2.5 as 0.5 gram of polymer in 100 milliliters of dimethyl-acetamide solution containing 4 grams of lithium chloride at 25° C. Magat describes in U.S. Pat. 3,184,436 the preparation of polyamides containing sulfonic acid moities which are particularly useful in making membranes to be treated as described herein. The preparation of permselective membranes of such polymers is described by Richter and Hoehn in U.S. Pat. 3,567,632.

Polyamides suitable for use in membranes of this invention include those obtained by the action of heat and, optionally, of chemicals upon polyamide-acids as taught, for example, by Koerner et al. in U.S. Pat. 3,022,200 and in the other patents and applications mentioned by Dinan in U.S. Pat. 3,575,936. Useful polyamide-acids include those of the AB type formed by self-condensation of an amino aromatic dicarboxylic acid anhydride or acid salt thereof as well as those of the AA—BB type formed by reaction of an aromatic tricarboxylic acid anhydride or acid halide thereof, or of an aromatic tetracarboxylic acid dianhydride, with an organic diamine. The preferred polyamide-acids are characterized by the structure

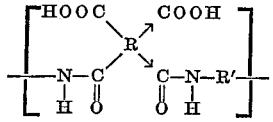

wherein→denotes isomerism, R is a tetravalent organic radical containing at least two carbon atoms, no more than two carbonyl groups of each polyamide-acid unit being attached to any one carbon atom of the tetravalent radical, and R' is a divalent radical containing at least two carbon atoms, the amide groups of adjacent polyamide-acid units each being attached to separate carbon atoms of the divalent radical. Either the R of the tetracarboxylic acid dianhydride or the R' of the organic diamine can be an aromatic radical, an aliphatic radical, or a combination of aromatic and aliphatic bridged radicals wherein the bridge is oxygen, nitrogen, sulfur, silicon, or phosphorus, and substituted groups thereof, so long as at least about 50 percent of these radicals contain 5-membered and 6-membered ring systems subject to resonance bonding.

In one class of preferred polymers substantially all of the —L— groups are amide groups. Among such polyamides are those obtained by condensation of a phthaloyl chloride mixture with a phenylenediamine mixture such as mixtures containing meta-phenylenediamine and ortho-phenylenediamine or paraphenylene diamine and similar mixtures containing a derivative of a phenylenediamine such as the calcium salt of meta-phenylenediamine sulfonic acid.

Aromatic polyhydrazides suitable for use in membranes of this invention embrace high molecular weight aromatic condensation polymers derived from hydrazine which are film- and fiber-forming. Preferably they are characterized by the recuring structural unit

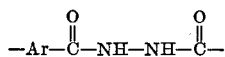

in the polymer chain, where Ar is a divalent aromatic radical having at least three nuclear atoms between points of attachment, at least 35 mole percent of the aromatic radicals in any polyhydrazide being other than paraphenylene radicals. Polymers with this structure include the condensation products of hydrazine or aromatic dihydrazides, e.g. a 50:50 weight ratio mixture of isophthalic dihydrazide and ethylene bis-4-benzoyl hydrazide, and a mixture of aromatic diacid chloride, e.g. a mixture of isophthaloyl chloride and terephthaloyl chloride. The preparation of typical polymers of this type is described by Frazer in U.S. Pat. 3,130,182, by Frazer and Wallenberger in the Journal of Polymer Science, part A, vol. 2, pages 1137–1145 and pages 1147–1156 (1964), and by Frazer et al. in the Journal of Polymer Science, part A, vol. 2, pages 1147–1169 (1960). The preparation of permselective membranes from such polymers is described by Richter and Hoehn in U.S. Pat. 3,567,632.

Poly(amide-hydrazides) suitable for use in membranes of this invention include polymers containing both amide and hydrazide linking groups. Preferred polymers exhibiting this structure include those obtained by condensation of one or more diacid chlorides, for example a mixture of 50 to 90 percent by weight of isophthaloyl chloride and the balance terephthaloyl chloride, with a mixture of metaphenylenediamine with at least one dihydrazide, for example ethylene-1-(3-oxybenzoic)-2-(4-oxybenzoic) dihydrazide. A particularly preferred polymer for use in the membranes in accordance with this invention is the polymer synthesized from a mixture of 80 mole percent of 3-aminobenzhydrazide and 20 mole percent of 4-aminobenzhydrazide and a mixture of 70 mole percent isophthaloyl chloride and 30 mole percent terephthaloyl chloride. The preparation of such polymers is described by Culbertson and Murphy in Polymer Letters, vol. 5, pages 807–812 (1967). The preparation of permselective membranes from such polymers is described by Richter and Hoehn in U.S. Pat. 3,567,632.

Aromatic polybenzimidazoles which are useful in membranes in accordance with this invention are characterized in recurring structural units of the type

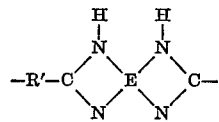

in which —R'— is a divalent radical as previously described and E is a tetravalent aromatic radical such as those of the types

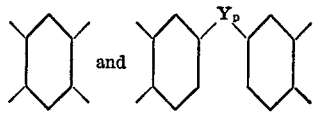

in which p is zero or one and Y is a divalent radical as defined above. These aromatic polybenzimidazoles can be prepared, for example, by the condensation of one or more aromatic tetramines of the type

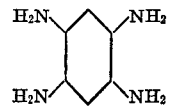

with one or more dicarboxylic acid chlorides of the formula

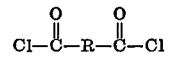

as disclosed by Marvel et al. in U.S. Reissue Pat. 26,065, based upon U.S. Pat. 3,174,947, and also in articles by Marvel et al. in the Journal of Polymer Science, vol. 50, pages 511–529 (1961) and in the Journal of Polymer Science, part A, vol. 1, pages 1531–1541 (1963). Polymers of the same general type can also be derived from bis-(3,4-diaminophenyl) compounds of the type

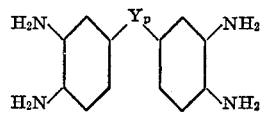

as described by Foster and Marvel in the Journal of Polymer Science, part A, vol. 3, pages 417–421 (1965). Other tetraamino compounds suitable for use in making such polymers are described by Brinkley et al. in U.S. Pat. 2,895,948.

The polymers useful in membranes as taught herein are preferably soluble in certain water-miscible dipolar aprotic solvents so that they can be put readily into membrane form as described by Richter and Hoehn in U.S. Pat. 3,567,632. The polymers preferably have a solubility of at least about 10 percent by weight at 25° C. in a medium consisting essentially of 0 to 3 percent by weight of lithium chloride in a solvent selected from the group consisting of dimethylacetamide, dimethylsulfoxide, N-methylpyrrolidone, hexamethylphosphoramide, and mixtures thereof. Some polymers which are highly crystalline, such as polymers containing a high percentage of para-linked aromatic groups, are not soluble to a practical extent in any of the above solvent mixtures.

(2) Treating agents

The organic materials which are effective in accordance with this invention in improving the reverse osmosis separation properties of membranes are ethers with formula weights larger than about 400 having in their chemical formulas a ratio of carbon atoms to oxygen atoms between about 2.5:1 and about 5:1. The ethereal oxygen atoms in these compounds can be part of a "backbone" structure as in condensation products of alkylene oxides or pendant upon a "backbone" structure as in polymers of vinyl ethers.

Depending on the particular chemical radicals in these ethers, they contain at least about 20 carbon atoms, or their equivalent in formula weight, in their formula along with about 8 oxygen atoms, in order to have a formula weight larger than about 400 with a ratio of carbon to oxygen atoms larger than about 2.5:1. They contain about 25 carbon atoms, or equivalent, along with at least about 5 oxygen atoms in order to have a formula weight larger than about 400 with a ratio of carbon to oxygen atoms of less than about 5:1.

One preferred class of the "pendant" type of ethers useful as treating agents of this invention is the polymers of vinyl ethers containing the recurring structural unit

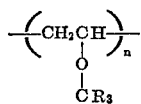

in which the end groups are not defined, are not critical, and are generally determined by the process of preparation, $n$ is at least 8, and preferably is between about 100 and about 2000, and R is hydrogen, methyl, or ethyl. These ethers are preferred because membranes treated therewith demonstrate the greatest reduction in salt passage, which improvement is retained for a long period of time with the membrane in use, and is not lost upon depressurizing the membrane. Particularly preferred is poly(methyl vinyl ether) with an average molecular weight of about 50,000. In this structure all the R's are hydrogen and the ratio of carbon atoms to oxygen is 3:1. Also useful are copolymers of vinyl methyl ether and vinyl ethyl ether. Commercially available polymers of methyl vinyl ether useful as described herein include "Gantrez" M–154 and M–093 sold by the GAF corporation.

Another preferred class of ethers, this of the "backbone" type, useful as treating agents is that of the general formula

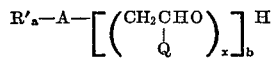

in which A is an oxygen radical —O—, a sulfide radical —S—, a carboxyl radical —CO$_2$—, a carbonamide radical —CONH—, an amino nitrogen radical —NH—, or a phosphoryl radical —PO$_3$≡. R'$_a$ is an organic radical attached to A through a carbon atom and can be a straight or branched chain saturated or unsaturated aliphatic radical or a mixed aliphatic-aromatic radical attached to A through a carbon of the aromatic nucleus and can contain inert linking groups, such as the named A groups, and inert substituents, such as halogen atom; Q is hydrogen or methyl; $a$ and $b$ are one when A is any of the above-named groups except the phosphoryl radical and are independently 1 or 2 when A is the phosphoryl radical, and $x$ is a whole or decimal number representing the average number of ethylene oxide units in the formula.

The value of $x$ and the number of carbon atoms in R$^1$ are restricted to numbers which provide a formula weight greater than about 400 and a carbon to oxygen atomic ratio between about 2.5:1 and about 5:1. For example, in the commercially available reaction product of dodecyl mercaptan and ten molecular proportions of ethylene oxide, R is the dodecyl radical C$_{1225}$—, A is a sulfur atom, $x$ is 10, the molecular weight is 640, and the carbon to oxygen atomic ratio is 3.2:1. These ethers are preferred generally because of a well-balanced combination of properties which they impart to polymer membranes ordinarily including good reduction in salt passage, slow flux rate decline, no loss of effectiveness on depressurization, and improved overall productivity.

When A in the above formula is an ethereal oxygen atom and R$^1$ is an aliphatic hydrocarbon structure, the treating agents have the structure $$R^2O(CH_2CH_2O)_xH$$

in which R$^2$ is a straight or branched chain saturated or unsaturated aliphatic hydrocarbon group which can contain inert linking groups or substituents. To provide a formula weight of about 400 and a carbon to oxygen atomic ratio greater than about 2.5:1, the R$^2$ group can contain 6 carbon atoms and $x$ can be 7. To provide a formula weight of about 400 and a carbon to oxygen atomic ratio of less than about 5:1, the R$^2$ group can contain 16 carbon atoms and $x$ can be 4. The number of carbon atoms in R$^2$ and the value of $x$ can be larger so long as the ratio of carbon atoms to oxygen atoms is within the range of about 2.5:1 and about 5:1 and the material. An example, of such a material which is commercially available is the reaction product of tridecyl alcohol and about 12 molecular proportions of ethylene oxide.

When A in the above formula is an ethereal oxygen atom and R$^1$ is a mixed aliphatic-aromatic group attached to A through the aromatic nucleus, treating agents have the structure

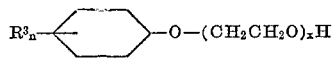

in which R$^3$ is a straight or branched chain saturated or unsaturated hydrocarbon radical attached to the aromatic nucleus and $n$ can be one to five. To provide a molecular weight of about 400 and a carbon to oxygen atomic ratio of greater than about 2.5:1, $x$ must have a value of 4 when R$^3$ is methyl and $n$ is one. Similarly, to provide a molecular weight of about 400 and a carbon to oxygen atomic ratio of less than about 5:1, $x$ must be 3 when R$^3$ is octyl. In the preferred treating agents of this type, R$^3$ contains 8 or 9 carbon atoms, $n$ is one, and $x$ is between about 5 and about 20. Typical commercially available materials of this class include condensation products of various amounts of ethylene oxide with iso-octylphenol and with iso-nonylphenol. These treating agents are particularly preferred because they have demonstrated an optimization of the combination of properties referred to above along with easy availability and practical economy.

Condensation products of ethylene oxide and aliphatic alcohols or alkyl amines having formula weights of about 400 and ratios of carbon to oxygen atoms between about 2.5:1 and about 5:1 are in general more soluble in cold water than in hot water. The solutions therefore become cloudy when heated above "cloud point" which depends on their chemical composition. In general, those materials with cloud point temperatures less than about 50° C. are most effective in improving the permselective properties of membranes and are therefore preferred as treating materials in the process described herein.

When A in the above formula is a carboxylic group, the treating agents have the structure

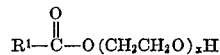

in which the R$^1$ group can contain 7 carbon atoms and $x$ can have a value of 6 to provide a structure with a formula weight of about 400 and a carbon to oxygen atomic ratio of 3.66:1. The number of carbon atoms in R and the value of $x$ can be larger so long as the ratio of carbon to oxygen atoms in the formula is within the range of about 2.5:1 and about 5:1. Representative of commercially available ethers of this class is the monostearate ester of a polyethyleneglycol of molecular weight about 400.

When A in the above formula is a carbonamide, the treating agent has the structure

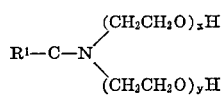

in which $R^1$ is as defined above and is preferably an aliphatic radical, $x$ and $y$ are whole or decimal numbers representing the average numbers of alkylene oxide units and $y$ may be zero. To provide a formula weight near 400 and a carbon to oxygen atomic ratio of about 2.5:1, the number of carbon atoms in $R^1$ is 11 and the sum of $x$ and $y$ is five. Representative of commercially available ethers of this type is the reaction product of 5 molecular proportions of ethylene oxide with the amide of oleic acid.

When A in the above formula is amino nitrogen, the treating agent has the structure

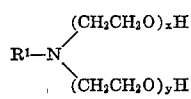

in which R, $x$ and $y$ are as defined above with respect to agents in which A is a carbonamide. To provide a formula weight near 400 and a carbon to oxygen atomic ratio of about 5:1, the number of carbon atoms in $R^1$ is 13 when the sum of $x$ and $y$ is five. A typical agent of this type is the reaction product of 10 molecular proportions of ethylene oxide with an amine made from the mixture of acids present in soybean glycerides.

Similar treating agents have the structure

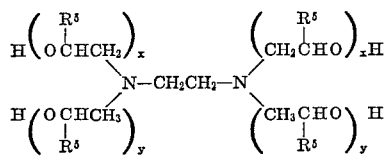

in which $R^5$ is independently hydrogen or methyl, provided that sufficient of the $R^5$ radicals are methyl so that the material has a ratio of carbon atoms to oxygen atoms greater than about 2.5:1. Commercially available materials of this type are obtained by the addition of propylene oxide to ethylene diamine or by the sequential addition of propylene oxide and ethylene oxide to ethylene diamine.

Another class of treating agent useful in practicing this invention are partial esters of one or more cyclic polyhydric alcohol-ethers containing a tetrahydropyran ring, a tetrahydrofuarn ring, or a condensed tetrahydrofuran ring, which rings are substituted with ethylene oxide units. These agents have the structural formula

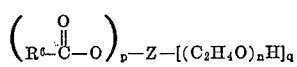

wherein Z is the residue remaining upon removal of two or more hydroxyl groups from a hydroxyalkyl-substituted tetrahydropyran, from a hydroxyalkyl-substituted tetrahydrofuran, or from a hydroxy-substituted condensed tetrahydrofuran ring, which polyhydroxy ring structure has at least one hydroxyl group for each three carbon atoms, $n$ is a whole or decimal number representing the number of ethylene oxide units in the structural formula, $p$ and $q$ are independently whole or decimal numbers from one to three and the sum of $p$ and $q$ is the number of hydroxyl groups in the tetrahydropyran, tetrahydrofuran, or condensed tetrahydrofuran ring structure which are esterified or etherified, and $R^6$ is a straight or branched-chain saturated or unsaturated aliphatic radical of about 10 to 18 carbon atoms. Such treating agents contain the rings

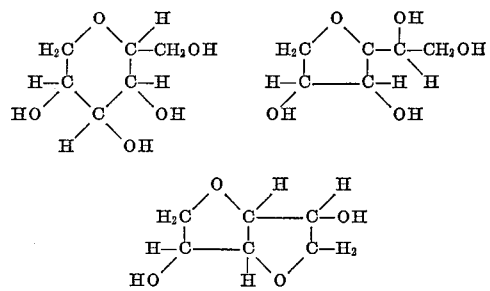

of the hexitans and hexides obtained by loss of water (anhydrization) of sorbitol. They are conventionally prepared by the ethoxylation of an ester of an aliphatic acid and the polyhydric carbocyclic alcohol. In order to contain an ethereal oxygen (other than the ring oxygen in the cyclic nucleus) and have a carbon to oxygen atomic ratio greater than about 2.5:1 and a molecular weight over 400, they must be an ester of an aliphatic acid containing 12 or more carbon atoms. If an ester of an aliphatic acid containing 12 or more carbon atoms, they must contain no more than 18 oxyethylene residues in order to have a carbon to oxygen atomic ratio greater than about 2.5:1. Representative of ethers of this class are the product of the reaction of five molecular proportions of ethylene oxide with sorbitan monooleate, and the reaction product of about 22 molecular proportions of ethylene oxide with sorbitan tristearate.

Another class of useful treating agents has the general formula

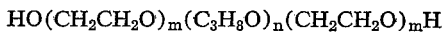

These materials are described in U.S. Pats. 2,674,619 and 2,677,700 and are commercially available. In the above formula the sum of $m$ and $m'$ is the average number of ethylene oxide units condensed with a polyoxypropylene containing $n$ propylene oxide units. In this class of treating agents, $n$ can have a value of 6 or larger and the sum of $m$ and $m'$ can be any number above one which results in a structure with a formula weight greater than about 400, so long as the products are sufficiently soluble to be useful, and $n$ is more than 5 greater than the sum of $m$ and $m'$ (required for a carbon to oxygen atomic ratio larger than about 2.5:1).

Other similar treating agents also useful as described herein are produced by the sequential addition of propylene oxide and ethylene oxide to a lower alcohol and therefore have the formula

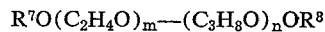

in which $m$ and $n$ are as defined above, and either $R^7$ or $R^8$ is a lower alkyl radical and the other is hydrogen. Such materials are also available commercially.

(3) Treating processes

Membranes of substantially linear, aromatic, synthetic organic, condensation polymers can be treated with the agents described herein by exposing them to the treating agent until the membrane has absorbed an effective amount of the agent. For instance, membranes can be dipped into a treating agent solution and then assembled into a permselective separation apparatus or they can be assembled into an apparatus and then exposed to a treating agent solution by passing the solution through the apparatus into contact with one surface of the membrane. A preferred treating technique is to expose the membrane to a treating agent solution under reverse osmosis conditions. For instance, effective treatment of hollow fiber membranes of aromatic polyamides are obtained by exposing them to aqueous solutions containing as little as 5 parts per million of poly(vinyl methyl ether) under pressures of 40 to 1000 pounds per square inch for times as short as ten minutes. Preferably such membranes are treated before extensive exposure to pressure or to saline solutions. Membranes can be treated by injecting small amounts of a treating agent into a saline solution being separated under reverse osmosis conditions. A preferred solvent is water but other solvents can be used, for example aqueous acetone and alcohol.

Experience has shown that very small amounts of treating agents are required in solutions contacted with membranes in practicing this invention. Solutions containing as little as 0.001 weight percent (10 parts per million) can be used. Higher concentrations up to 2.0 weight percent and larger can also be used. A solution containing 0.05 weight percent (500 parts per million) to 1.0 weight percent is preferred in a dipping process and a solution containing 0.001 to 0.05 weight percent (10 to 500 parts per million) is preferred in a process involving exposure of the membrane to the solution under reverse osmosis conditions. The concentration of treating agent required in a treating solution will, of course, depend upon such factors as the treating agent, the physical structure and chemical composition of the membrane, the relative amounts of membrane and treating solution used, and the degree of change in salt passage desired from the treatment. One skilled in the art can determine easily and without excessive experimentation a treating solution concentration which is effective.

The mechanism by which treating agents used in accordance with this invention reduce the passage of solutes through the described reverse osmosis membranes is not fully understood. Very small amounts of treating agents are usually required, as described above and illustrated in the examples below. These treating agents are absorbed rapidly such as from solutions containing only a few parts per million of an effective agent, are held tenaciously by membranes of nitrogen-linke synthetic organic polymers, and have long-lasting effects on their salt rejection properties. Such effects are manifest for long times after exposure of such membranes to a solution of a treating agent, whether or not the membrane is subsequently maintained under reverse osmosis conditions. These observations suggest that the treating agents change the surface properties of the membranes without significantly affecting their bulk properties. Other observations of membranes exposed to solutions containing larger amounts of treating agents suggest larger changes in the physical properties of the membranes and of the polymers of which they are made. It is therefore presumed that these treating agents can function by different mechanisms dependent upon the amounts of the treating agent present and upon the chemical and physical properties of the treating agent and the membrane.

Certain of the membrane treating agents described herein are unusually effective in a method of treating which involves the simultaneous or subsequent exposure of the membrane to water or an aqueous mixture at elevated temperatures in the range of about 50° C. to about 90° C. These agents are those of the structural formula

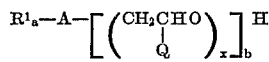

and particularly those of the structural formula

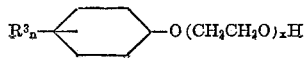

described above. A particularly preferred method of treating involves the exposure of a permselective membrane of a substantially linear aromatic synthetic organic nitrogen-linked polymer to a solution containing between about 0.001 percent and about 2 percent of a treating agent having the structural formula

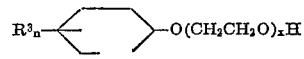

in which $R^3$ is an alkyl radical containing 8 or 9 carbon atoms, $n$ is one, and $x$ is between about 5 and about 20 at a temperature between about 50° C. and about 90° C. for a time between about 2 hours and about 24 hours. Such methods result in a greater improvement in the salt rejection properties of the membrane than are observed upon exposure of the membrane to a solution of the treating agent at ambient temperatures or upon exposure to water alone at elevated temperatures.

U.S. patent application Ser. No. 880,300, filed Nov. 26, 1969, describes the treatment of membranes of the type described herein to preserve their permeability properties and to protect them against loss of these properties by replacing membrane-associated water with an organic medium such as glycerine. The treating methods and agents described herein can be effectively employed simultaneously or sequentially with the processes described in application Ser. No. 880,300.

The following examples illustrate this invention. The parts and percentages therein are by weight unless otherwise indicated.

EXAMPLE I

A polyamide was prepared in dimethylacetamide solution, substantially as described by Kwolek et al. in Example 14 of U.S. Pat. 3,063,966, from a mixture of 85 parts of metaphenylenediamine and 15 parts of paraphenylenediamine and a stoichiometrically equivalent mixture of 70 parts of isophthaloyl chloride and 30 parts of terephthaloyl chloride. The resulting polymer was spun from dimethylacetamide solution containing 5 percent lithium chloride (based on the polymer present) substantially as described in Example 2 of Richter et al. U.S. Pat. 3,567,632. The water-washed hollow fiber membranes thus obtained had an outside diameter of 67 microns and an inside diameter of 33.8 microns. They were kept wet with water until use.

The osmotic properties of these fibers were studied in a minor modification of the simple test described by McLain et al. in U.S. Pat. 3,423,491. In this modification, a loop of multifilament yarns was sealed into a pressure tube with the open ends of the fibers extending from a fitting at one end of the tube. Deionized water under a pressure of 40 to 50 pounds per square inch was permeated through the walls of the fibers into bores and out their ends to insure thorough removal of residual salts, solvents, and air bubbles from the fibers. A capillary tube was sealed to the end of the pressure tube to collect water from the open ends of the fibers and this capillary tube was filled with water. The deionized water in the pressure tube outside the fibers was replaced with an aqueous solution containing one percent sodium chloride. The rate of water flow outwardly through the walls of the hollow fibers into the salt solution at atmospheric pressure was observed. The initial rate of water flow was determined by extrapolation of the data obtained and from this value was calculated the water flux expected under reverse osmosis conditions. The change in the rate of water flow with time was used to estimate the percent salt passage expected under reverse osmosis conditions.

In this test the polyamide hollow fiber membranes described above had an initial water flow rate corresponding to a water flux of 0.53 gallon per square foot per day with an aqueous solution containing 2000 parts per million of chloride ion as sodium chloride at a pressure of 400 pounds per square inch. The rate of change of water flow rate with time corresponded to a salt passage of 3.8 percent under the same reverse osmosis conditions.

A duplicate sample of the fiber membranes used in the above test was treated briefly with water containing one weight percent of the condensation product of about 20 moles of ethylene oxide with an alkyl amine (which condensation product is designated G-3780A by Atlas Chemical Industries) and thoroughly rinsed with deionized water. After this treatment a repetition of the above-described test showed the treated polyamide hollow fiber membranes to have an increased water flow corresponding to a water flux of 0.62 gallon per square foot per day and the rate of change of water flow rate corresponded to a salt passage of only 0.8 percent.

EXAMPLE II

A mixture of 70 parts of isophthaloyl chloride and 30 parts of terephthaloyl chloride was added gradually to a dimethylacetamide solution of a substantially stoichiometric amount of a mixture of 80 parts of metaphenylenediamine and 20 parts of the calcium salt of meta-phenylenediamine-4-sulfonic acid, substantially as described by Magat in Example 10 of U.S. Pat. 3,184,436. A solution of the resulting polymer in dimethylacetamide containing about .15 part of lithium nitrate and about 0.3 part of lithium chloride per part of polymer present was spun substantially as described in Example 2 of Richter et al. U.S. Pat. 3,567,632. The water extracted hollow fiber membranes obtained had an outside diameter of 85 microns and an inside diameter of 43 microns. They were kept wet with water until used.

A 150-filament skein of the water extracted hollow fiber membranes was doubled to obtain 300 hollow fibers and, while wet with water, was sealed with epoxy resin into both ends of a metal tube fitted with a side tube near each end, thereby obtaining an effective fiber length of 19 inches and a nominal effective area of 0.280 square foot of membrane surface. The hollow fibres were carefully cut outside the end seals to open them for fluid flow. An end fitting and a pressure gauge were attached at one end for measurement of "dead end" pressure and the other end was attached to a burette for measurement of water flow from the open ends of the fibers under reverse osmosis conditions. Three such units were assembled.

Using an aqueous solution containing 0.5 percent sodium chloride and a feed pressure of 600 pounds per square inch, one of these units after 24 hours had a water permeation rate of 2.72 gallons per square foot per day (GFD) and a salt passage of 1.83 percent at a conversion (the fraction of the feed solution passing through the membrane) of 14 percent. The pressure on the feed solution was then released and the unit was installed in a test rack for longevity testing. After 135 days under the same reverse osmosis conditions, this unit had a water permeation rate of 0.861 gallon per square foot per day and a salt passage of 1.3 percent with a "dead end" pressure of 295 pounds per square inch. During this period the water permeation rate corresponded substantially to the equation $$\log \text{GFD} = \log 2.1 - 0.18 \log (\text{days})$$

Using an aqueous solution containing 2000 parts per million of chloride ion as calcium chloride, the second of these units after about 30 hours had a water permeation rate of 2.23 gallons per square foot per day and a salt passage of 2.89 percent at a conversion of 9.5 percent. This unit was filled with an aqueous solution containing 4 percent of a condensation product of octyl phenol and ethylene oxide in an average ratio of 1:9.5, a composition having a ratio of carbon atoms to oxygen atoms of 3.1:1 and a formula weight of 624, and after 3 days was thoroughly rinsed with water. After about 6 hours this unit had a water permeation rate of 1.56 gallons per square foot per day and a salt passage of 1.1 percent at a conversion of 9.0 percent with a "dead end" pressure of 157 pounds per square inch using an aqueous solution containing 2000 parts per million of chloride ion as sodium chloride at 600 pounds per square inch. The pressure on the feed solution was released and the unit was installed in a test rack for longevity testing. With the conditions of further testing of the first unit of this example, the water permeation rate was 0.951 gallon per square foot per day and the salt passage was 0.6 percent after 114 days and the "dead end" pressure was 140 pounds per square inch. During this period the water permeation rate corresponded substantially to the equation $$\log \text{GFD} = \log 1.5 - 0.11 \log (\text{days}).$$

Using a solution containing 2000 parts per million of chloride ion as calcium chloride, the third of these units after 24 hours had a water permeation rate of 2.54 gallons per square foot per day and a salt passage of 2.65 percent with a conversion of 9.6 percent. This unit was filled with an aqueous solution containing 20 percent glycerine and 4 percent of the reaction product of octyl phenol and ethyleen oxide used with the second unit as described above. After about 16 hours the unit was rinsed thoroughly with water. After about 2 more hours this unit had a water permeation rate of 2.14 gallons per square foot per day and a salt passage of 1.39 percent at a conversion of 8 percent with a "dead end" pressure of 142 pounds per square inch under the test conditions of the first unit of this example. The pressure on the feed solution was released and the unit was installed in a test rack for longevity testing. After 111 days under the conditions of further testing of the first unit of this example, the water permeation rate was 1.11 gallons per square foot per day and the salt passage was 0.8 percent with a "dead end" pressure of 135 pounds per square inch. During this period the permeation rate corresponded substantially to the equation $$\log \text{GFD} = \log 1.7 - 0.11 \log (\text{days})$$

EXAMPLE III

Hollow fiber membranes having an outside diameter of 74 microns and an inside diameter of 34 microns were prepared substantially as described in Example II. A reverse osmosis unit similar to that described in Example II was assembled from 80-filament skeins of these fibers with an effective length of 11 inches and an effective membrane area of 0.111 square foot. There was passed through the shell of this unit an aqueous sodium chloride solution containing 2000 parts per million of chloride ion. After 24 hours at a pressure of 600 pounds per square inch and a conversion of about 15 percent, the hollow fiber membranes had a water permeation rate of 2.48 gallons per square foot per day. After 27 days that rate was 1.99 gallons per square foot per day and the salt passage was 5.9 percent with a "dead end" pressure of 140 pounds per square inch. The water permeability rate during this period conformed substantially to the equation $$\log \text{GFD} = \log 2.76 - 0.103 \log (\text{days})$$

A portion of these hollow filament membranes was placed in a vessel through which water was circulated while glycerine was added portionwise over several hours until the glycerine content of the supernatant liquid was about 20 percent. To this supernatant liquid was added the condensation product of octyl phenol and ethylene oxide described in Example II in an amount sufficient to provide a concentration of 4 percent. The hollow fiber membranes were left overnight in the resulting mixture of water, glycerine, and polyethoxy-octylphenol, drained free of the mixture for nine days, and hung for 60 hours in air. The dried hollow fiber membranes were then assembled into reverse osmosis test units with an effective length of 19.5 inches and an effective membrane area of 0.097 square foot as described in Example II. The hollow fiber membranes were exposed to an aqueous solution of sodium chloride under reverse osmosis conditions as described above at conversions of about 4 percent. After one day they had a water permeability of 1.19 gallons per square foot per day. After 10 days they had a water permeability of 0.97 gallon per square foot per day and a salt passage of only 1.5 percent. The pressure on the feed solution was released and the unit was installed in a test rack for longevity testing. After an additional 28 days at a conversion between about 10 percent and about 15 percent, the water permeation rate was 1.02 gallons per square foot per day and the salt passage was only 1.2 percent with a "dead end" pressure of 270 pounds per square inch. During about 50 days the water permeation rate corresponded substantially to the equation log GFD=log 1.11−0.0225 log (days)

At 198 and 305 days, after several periods when the pressure on the feed solution was released, the salt passage was 0.8 and 1.2 percent.

EXAMPLE IV

Several reverse osmosis units were assembled using the hollow fiber membranes and techniques of Example II except that the fibers in each unit had an effective length of 24 inches and an effective membrane area of 0.256 square foot. One of these units, after 93 hours exposure to an aqueous solution containing 0.5 percent sodium chloride at 600 pounds per square inch and a conversion of about 14.5 percent, had a water permeation rate of 2.83 gallons per square foot per day and a salt passage of 2.0 percent with a "dead end" pressure of 147 pounds per square inch. After 45 days under the same conditions the salt passage was 0.9 percent and the water permeation rate was 1.90 gallons per square foot per day at a "dead end" pressure of 125 pounds per square inch. During this period, the water permeation rate conformed substantially to the equation log GFD=log 2.90−0.131 log (days)

Before assembly of one of these units, the hollow fiber membranes were held in water at 55° C. overnight. This unit after about 22 hours under the reverse osmosis conditions described above at a conversion of about 8 percent, had a water permeation rate of 2.11 gallons per square foot per day and a salt passage of 1.6 percent with a "dead end" pressure of 112 pounds per square inch. After 45 days under these reverse osmosis conditions, the salt passage was 1.7 percent and the water permeation rate was 1.40 gallons per square foot per day at a "dead end" pressure of 140 pounds per square inch. During this period the water permeation rate conformed substantially to the equation log GFD=log 1.78−0.070 log (days)

Before assembly of another of these units, the hollow fiber membranes were held overnight in water at 55° C. and then overnight in an aqueous solution containing 2 percent of the condensation product of octyl phenol and ethylene oxide described in Example II. This unit, after 24 hours under the reverse osmosis conditions described above at a conversion of about 8 percent, had a water permeation rate of 1.67 gallons per square foot per day and a salt passage of 0.5 percent with a "dead end" pressure of 106 pounds per square inch. After 45 days under these reverse osmosis conditions, the water permeation rate was 1.44 gallons per square foot per day and the salt passage was only 0.3 percent at a "dead end" pressure of 108 pounds per square foot. During this period the water permeation rate conformed substantially to the equation log GFD=log 1.53−0.026 log (days)

Before assembly of another of these units, the hollow fiber membranes were held overnight in water at 55° C. and then overnight at 55° C. in an aqueous solution containing 2 percent of the condensation product of octyl phenol and ethylene oxide described in Example II. This unit, after 24 hours under reverse osmosis conditions described above at a conversion of about 12.4 percent, had a water permeation rate of 1.04 gallons per square foot per day and a salt passage of 0.39 percent with a "dead end" pressure of 61 pounds per square inch. After 45 days under the same reverse osmosis conditions, the water permeation rate was 1.05 gallons per square foot per day and the salt passage was only 0.1 percent at a "dead end" pressure of 65 pounds per square inch. During this period the water permeation rate conformed substantially to the equation log GFD=log. 1.14−0.028 log (days)

Before assembly of another of these units, the hollow fiber membranes were held overnight at ambient temperature in an aqueous solution containing 2 percent of the condensation product of octyl phenol and ethylene oxide described in Example II and then overnight in water at 55° C. This unit, after about 6 hours under the reverse osmosis conditions described above at a conversion of about 8 percent, had a water permeation rate of 0.849 gallon per square foot per day and a salt passage of 0.33 percent with a "dead end" pressure of 60 pounds per square inch. After 45 days under the same reverse osmosis condition, the water permeation rate was 1.08 gallons per square foot per day and the salt passage was only 0.1 percent at a "dead end" pressure of 90 pounds per square inch. During this period, the water permeation rate corresponded substantially to the equation log GFD=log 0.97+0.025 log (days)

Before assembly of another of these units, the hollow fiber membranes were held at 55° C. overnight in an aqueous solution containing 2 percent of the condensation product of octyl phenol described in Example II. This unit, after about 20 hours under the reverse osmosis conditions described above at a conversion of about 7.6 percent, had a water permeation rate of 1.11 gallons per square foot per day and a salt passage of 0.47 percent at a "dead end" pressure of 66 pounds per square inch. After 45 days under the same reverse osmosis conditions the salt passage was only 0.2 percent and the water permeation rate was 1.17 gallons per square foot per day at a "dead end" pressure of 60 pounds per square inch. During this period the water permeation rate conformed substantially to the equation log GFD=log 1.13−0.003 log (days)

EXAMPLE V

A polymer (A) of the same composition as that of Example II was prepared substantially as described therein. This polymer was obtained as a solution consisting of about 25 percent of the polymer in dimethylacetamide containing about 15 percent lithium nitrate and about 4 percent lithium chloride (based on the polymer present). This solution was diluted to about 15 percent polymer with dimethylacetamide. Films were cast on metal plates substantially as described in Richter et al. U.S. Pat. 3,567,632, Example I, using a doctor knife to obtain a nominal thickness of 15 mils. The film and plate were placed for 5 minutes on a hot plate at 100° C. in a ventilated hood to evaporate a portion of the solvent and to obtain a protomembrane. The protomembrane and the supporting plate were immersed in stirred room-temperature water until the membrane was substantially free of dimethylacetamide. The resulting film membrane was kept wet with water until used.

A mixture of 70 parts of isophthaloyl chloride and 30 parts of terephthaloyl chloride was added portionwise to a dimethylacetamide solution of a substantially stoichiometric quantity of a mixture of 80 parts of 3-aminobenzhydrazide and 20 parts of 4-aminobenzhydrazide. The resulting polymer solution was poured into ice water and the precipitated polymer (B) was washed substantially free of dimethylacetamide. A solution was prepared with 15 percent of this polymer in dimethylacetamide containing 30 percent of lithium nitrate and 40 percent of N,N'-diacetyl-N,N'-dimethyl-3,6-dioxa-1,8-octanediamine (the diacetamide of N,N'-dimethyltriglycoldiamine), and 0.5 percent triethanolamine (based on the polymer present). Films of this solution were cast on metal plates substantially as described by Richter et al. in U.S. Pat. 3,567,632. The film and supporting plate were placed for 10 minutes in a ventilated hood on a hot plate at 95° C. to form a protomembrane and then were immersed in stirred room-temperature water for about one hour to obtain a film membrane. This film membrane was kept wet with water until used.

A mixture of 70 parts of isophthaloyl chloride and 30 parts of terephthaloyl chloride was added gradually at 20° C. to 25° C. over about 5 hours to a solution of substantially stoichiometric amounts of pyridine and of the calcium salt of metaphenylenediamine-4-sulfonic acid. After an additional 2 hours, the reaction mixture was drowned in acetone and the precipitated polymer (C) was washed with ethyl alcohol and dried. It had an inherent viscosity of 1.15 (measured with 0.5 gram of polymer in 100 milliliters of dimethylacetamide containing 4 grams of lithium chloride) and contained 8.5 percent sulfur and 4.0 percent calcium (theoretical 9.5 percent sulfur and 5.5 percent calcium).

Three preparations were made, in each of which a mixture of 70 parts of isophthaloyl chloride and 30 parts of terephthaloyl chloride was added gradually at 5° C. to 40° C. to a substantially stoichiometric amount of metaphenylenediamine dissolved in dimethylacetamide. After an additional one to two hours, the reaction mixtures were poured into ice water and the precipitated polymer (D) was washed with water and dried. The polymers from these preparations had inherent viscosities of 1.22; 1.15; and 1.16 (measured with 0.5 gram of polymer in 100 milliliters of dimethylacetamide containing 4 grams of lithium chloride). These preparations were combined to obtain a mixture with an inherent viscosity of 1.19.

A blend of 25 parts of polymer C and 75 parts of polymer D was dissolved in dimethylacetamide containing 30 percent lithium nitrate (based on the polymer present). A film of this solution was cast onto a metal plate, using a doctor knife to obtain a nominal thickness of 15 mils. The film and supporting plate were placed for 1.5 minutes on a hot plate at 100° C. in a ventilated hood to evaporate a portion of the solvent and to obtain a protomembrane. The protomembrane and plate were then immersed in and rinsed for about one hour with water at room temperature until the resulting membrane was substantially free of dimethylacetamide. This film membrane was kept wet with water until used.

The film membranes made of polymers A and B and of the blend of polymers C and D as described above were mounted in stirred reverse osmosis test cells through which were passed continuously aqueous solutions at a pressure of 600 pounds per square inch at a rate such that less than about 10 percent of the solution passed through the membranes. The following aqueous solutions were used in the sequence shown for the periods of time specified below in Table I:

Solution I—0.0564 molar sodium chloride (2000 parts per million of chloride ion).
Solution II—0.0564 molar sodium chloride and 100 parts per million of the condensation product of ethylene oxide and octyl phenol described in Example II.

The reverse osmosis properties of these films membranes are summarized in Table I.

TABLE I

| Film membrane | Feed solution | Days, in sequence | Salt passage, percent |
|---|---|---|---|
| Polymer A | I | 5 | 1.63 |
| | II | 2 | 0.92 |
| | I | 13 | 1.28 |
| Polymer B | I | 5 | 1.75 |
| | II | 2 | 0.88 |
| | I | 7 | 1.31 |
| Blend of polymers C and D | I | 1 | 0.86 |
| | II | 1 | 0.65 |
| | I | 5 | 0.62 |

EXAMPLE VI

Film membranes of Polymers A and B were prepared substantially as described in Example V.

A mixture of 70 parts of isophthaloyl chloride and 30 parts of terephthaloyl chloride was added gradually to a solution of a substantially stoichiometric amount of metaphenylenediamine in dimethylacetamide. A calcium base was added to neutralize the hydrogen chloride formed, thereby forming calcium chloride. The resulting neutral solution containing about 19 percent polymer (E) was diluted with dimethylacetamide to obtain a solution containing about 11 percent polymer and 45 percent calcium chloride (based on the polymer present). This solution was cast as a film onto a metal plate, using a doctor knife to obtain a film nominally 15 mils thick. The film and plate were placed for 10 minutes on a hot plate at 80° C. in a ventilated hood to evaporate a portion of the solvent and to obtain a protomembrane. This protomembrane and the support plate were immersed in and rinsed with water at 18° C. to 20° C. until the membrane was substantially free of dimethylacetamide. The resulting film membrane was kept wet with water until used.

The film membranes of Polymers A, B, and E made as described were mounted in stirred reverse osmosis test cells and their desalination properties were determined as described in Example V. The following aqueous solutions were used in the sequence shown for the periods of time specified below in Table II:

Solution I—0.0564 molar sodium chloride (2000 parts per million of chloride ion).
Solution IIb.—0.0564 molar sodium chloride and 100 parts per million of poly(vinylmethyl ether), average molecular weight about 50,000 ("Gantrez" M-154, GAF Corp.).

The reverse osmosis properties of these film membranes are summarized in Table II.

TABLE II

| Film membrane | Feed solution | Days, in sequence | Salt passage, percent |
|---|---|---|---|
| Polymer A | I | 13 | 2.78 |
| | IIb | 4 | 1.58 |
| | I | 18 | 1.60 |
| Polymer B | I | 1 | 2.97 |
| | IIb | 4 | 0.97 |
| | I | 18 | 0.73 |
| Polymer E | I | 1 | 48 |
| | IIb | 4 | 31 |
| | I | 18 | 35 |

EXAMPLE VII

A polymer was prepared from a mixture of 80 parts of metaphenylenediamine and 20 parts of the calcium salt of metaphenylenediamine-4-sulfonic acid and a mixture of 70 parts of isophthaloyl chloride and 30 parts of terephthaloyl chloride and made into hollow fiber membranes substantially as described in Example II. These hollow fiber membranes were exposed overnight to solutions containing 2 percent by weight of the treating materials listed in Table III and then were assembled into reverse osmosis units as described in Example IV. The reverse osmosis properties of the treated membranes were determined with an aqueous sodium chloride solution containing 2000 parts per million of chloride ion. After 24 hours at a pressure of 600 pounds per square inch and a conversion of about 15 percent, the hollow fiber membranes had the water permeation rates and salt passages given in Table III.

sulting membrane had a thickness of 4.5 mils after rinsing thoroughly with water.

A portion of this membrane had a water flux of 4.4 gallons per square foot per day and a salt passage of 3.5 percent after exposure for 6 days at 600 pounds per square inch to an aqueous solution containing 0.5 percent sodium chloride. While still in the reverse osmosis

TABLE III

| No. | Brand name, number | Structural formula | Formula weight | Carbon/oxygen ratio | Cloud point, °C | Salt passage, percent | Water flux, GFD | "Dead end" pressure, p.s.i.g. |
|---|---|---|---|---|---|---|---|---|
| | None | | | | | 3.5 | 2.5 | 160 |
| | do | | | | | 3.1 | 2.6 | 154 |
| | do | | | | | 1.4 | 2.7 | 170 |
| A | "Igepal" CA-720 | $C_8H_{17}$—⟨⟩—$O(CH_2CH_2O)_{12.5}H$ | 756 | 2.9 | 59 | 1.1 / 1.1 | 1.9 / 1.9 | 118 / 134 |
| B | "Igepal" CO-630 | $C_9H_{19}$—⟨⟩—$O(CH_2CH_2O)_9H$ | 616 | 3.3 | 54 | 1.1 / 1.1 | 2.1 / 2.3 | 125 / 145 |
| C | "Igepal" CO-850 | $C_9H_{19}$—⟨⟩—$O(CH_2CH_2O)_{20}H$ | 1,100 | 2.7 | >100 | 1.6 / 1.6 | 2.0 / 1.9 | 127 / 111 |
| D | "Igepal" RC-520 | $C_{12}H_{25}$—⟨⟩—$O(CH_2CH_2O)_5H$ | 482 | 4.7 | 30 | 0.48 / 0.44 | 1.9 / 2.0 | 119 / 131 |
| E | "Triton" X-100 | $C_8H_{17}$—⟨⟩—$O(CH_2CH_2O)_{9.5}H$ | 624 | 3.1 | 65 | 1.5 / 1.3 / 0.7 | 2.0 / 2.2 / 2.0 | 129 / 140 / 122 |
| F | | $C_{6-13}F_{13-27}$—$CH_2CH_2O(CH_2CH_2O)_{23.7}H$ | >400 | 2.5 | 70-100 | 1.3 / 1.6 | 2.1 / 2.3 | 178 / 143 |
| G | "Pluronic" F-108 | $HO(CH_2CH_2O)_{30}$—$(C_3H_6O)_{52}$—$(CH_2CH_2O)_{30}H$ | 5,674 | 2.44 | >100 | 1.5 / 1.8 | 2.0 / 2.0 | 133 / 138 |
| H | "Pluronic" L-64 | $HO(CH_2CH_2O)_{12}$—$(C_3H_6O)_{28}$—$(CH_2CH_2O)_{12}H$ | 2,698 | 2.6 | 30 | 1.5 / 1.0 | 2.0 / 2.1 | 133 / 141 |
| I | "Pluronic" L-61 | $HO(CH_2CH_2O)_2$—$(C_3H_6O)_{28}$—$(CH_2CH_2O)_2H$ | 1,774 | 2.8 | a25 | 1.2 / 0.35 / 1.1 | 0.91 / 1.08 / 1.33 | 65 / 72 / 129 |
| J | "Tetronic" 504 | $[H(CH_2CH_2O)_6$—$(C_3H_6O)_7 \backslash N-CH_2-]_2$ / $[H(CH_2CH_2O)_6$—$(C_3H_6O)_7 /]$ | 2,744 | 2.6 | a64 | 0.8 / 2.6 | 1.9 / 1.7 | 110 / 110 |
| K | | Equimolar mixture of— $C_8H_{17}$—O—$\overset{O}{\underset{\|}{P}}$—$[O(CH_2CH_2O)_2H]_2$ and $[C_8H_{17}$—$O]_2$—$\overset{O}{\underset{\|}{P}}$—$O(CH_2CH_2O)_2H$ | 385 / 410 | 2.0 / 3.3 | a<0 | 0.6 / 2.9 | 1.9 / 2.0 | 120 / 128 | a Incompletely soluble.

EXAMPLE VIII

To 42.3 grams of metaphenylenediamine dissolved in 750 milliliters of dimethylacetamide was added 173.9 grams (an essentially equimolar amount) of the anhydride of 1,1,1,3,3,3-hexafluoro-2,2-bis(3,4-dicarboxyphenyl)propane. The mixture was stirred at 50° C. for about one hour to obtain a solution of the corresponding poly(amide-acid). A mixture of 164 grams each of triethylamine and acetic anhydride was added and the solution was stirred at 50° C. for an additional 1.5 hours to obtain a clear yellow-brown solution of the corresponding polyamide. The product was precipitated by pouring the solution into methanol in a high-speed mixer, was isolated by filtration, and was dried to obtain 199 grams of polymer with an inherent viscosity of 0.58. A solution of 15 grams of this polymer in 80.5 grams of dimethylacetamide containing 4.5 grams of lithium nitrate and three drops of triethanolamine was cast onto a glass plate with a doctor knife at a nominal thickness of 15 mils. The film and glass plate were heated on a hot plate for one minute at 100° C. in a ventilated hood to obtain a protomembrane and then were cooled to room temperature and immersed in methanol at 25° C. to convert the protomembrane into a permselective membrane. The resulting membrane had a thickness of 4.5 mils after rinsing thoroughly with water.

cell, this membrane was exposed for two hours at 40 pounds per square inch to an aqueous solution containing 100 parts per million of poly(vinyl methyl ether) ("Gantrez" M-154). This treated membrane after one day had a water flux of 2.6 gallons per square foot per day and a salt passage of only 1.3 percent and after 60 days a water flux of 1.0 gallon per square foot per day and a salt passage of only 1.6 percent with the same test solution and reverse osmosis conditions.

EXAMPLE IX

A reverse osmosis unit was assembled as described in Example IV with the hollow fiber membranes of Example II. With an aqueous solution containing 5000 parts per million of sodium chloride at 600 pounds per square inch, the membranes had a water permeation rate of 3.2 gallons per square foot per day and a salt passage of 2.3 percent with a "dead end" pressure of 197 pounds per square inch. This unit was thoroughly flushed with an aqueous solution containing 100 parts per million of poly(vinyl methyl ether) ("Gantrez" M-154, GAF Corp.) and the membranes were then exposed to the solution for 15 minutes at 600 pounds per square inch. After flushing with the aqueous sodium chloride solution, the membranes under reverse osmosis conditions had a water permeation rate of 3.0 gallons per square foot per day and a salt passage of only 0.25 percent with a "dead end" pressure of 186 pounds per square inch.

A similar reverse osmosis unit was assembled with the hollow fiber membranes of Example VII. The membranes in this unit under reverse osmosis conditions had a water permeation rate of 2.7 gallons per square foot per day and a salt passage of 1.0 percent with a "dead end" pressure of 165 pounds per square inch. This unit was then thoroughly flushed with an aqueous solution containing 10 parts per million of poly(vinyl methyl ether) and was then exposed to the solution for 5 minutes at 600 pounds per square inch. After flushing with the aqueous sodium chloride solution, the membranes under reverse osmosis conditions had a water permeation rate of 2.6 gallons per square foot per day and a salt passage of only 0.6 percent with a "dead end" pressure of 165 pounds per square inch.

Another reverse osmosis unit was assembled as above and the membranes in this unit under reverse osmosis conditions had a water permeation rate of 2.7 gallons per square foot per day and a salt passage of 1.4 percent with a "dead end" pressure of 161 pounds per square inch. This unit was then thoroughly flushed with an aqueous solution containing 10 parts per million of poly(vinyl methyl ether) and then was exposed to this solution for 15 minutes at 40 pounds per square inch. After flushing with the aqueous sodium chloride solution, the membranes in this unit had a water permeation rate of 2.7 gallons per square inch per day and a salt passage of only 0.8 percent with a "dead end" pressure of 164 pounds per square inch.

EXAMPLE X

A copolymer of methyl vinyl ether and ethyl vinyl ether was prepared substantially as described on page 270 of the book "Preparative Methods of Polymer Chemistry" (second edition), by Sorenson and Campbell, Interscience Publishers, New York (1968). To an agitated mixture of liquid propane, 80 parts of vinyl methyl ether, and 20 parts of vinyl ethyl ether cooled with solid carbon dioxide and acetone was added three drops of boron trifluoride etherate as a catalyst. After about 30 minutes a second three drops of the catalyst were added and after an additional 90 minutes the reaction mixture was permitted to warm to about −40° C. and then held at this temperature for two hours. The resulting polymer was dissolved in absolute ethanol containing a small amount of an antioxidant, the solution was filtered, and the alcohol was removed under vacuum. The isolated polymer had an inherent viscosity of 0.43, measured as 0.5 percent solution in benzene at 30° C. An aqueous solution of the polymer was prepared by dissolving 0.5 part of the polymer in 49.5 parts of ethanol, adding the solution to 9950 parts of water, and stirring for three hours to obtain a transparent solution.

Hollow fiber reverse osmosis test units were assembled as described in Example IV. The desalination properties of the hollow fiber membranes were determined with an aqueous sodium chloride solution containing 2000 parts per million of chloride ion at a pressure of 600 pounds per square inch. In duplicate tests, the membranes after about 20 hours had an average water flux of 2.95 gallons per square foot per day and an average salt passage of 2.2 percent. The membranes were then exposed to the polymer solution described above for two hours at a pressure of 40 pounds per square inch. After an additional exposure to the aqueous salt solution at 600 pounds per square inch for about 20 additional hours, the membranes had an average water flux of 2.73 gallons per square foot per day and an average salt passage of only 1.0 percent.

EXAMPLE XI

A mixture of equimolar amounts of 3,4′,4,4′-tetraaminodiphenyl ether tetrahydrochloride, 3,3′,4,4′-tetraaminobenzidine tetrahydrochloride, dimethyl-4,4′-oxydibenzoate, and isophthalic acid was heated at 180° C. in polyphosphoric acid to obtain a polybenzimidazole. The resulting solution was poured into water to precipitate the polymer, which was washed thoroughly with water and dried. A solution of 5 parts of this polymer in 33 parts of dimethylacetamide containing 7 percent lithium nitrate was cast onto a plate, using a doctor knife to obtain a film 20 mils thick. The plate and film were heated at 80° C. for 6 minutes to obtain a protomembrane and then were quenched in water to obtain a membrane. The membrane was washed substantially free of solvent and salt and was kept water-wet until use.

A portion of this membrane had a water flux of 15.2 gallons per square foot per day and a salt passage of 31 percent after exposure for 7 days at 600 pounds per square inch to an aqueous solution containing 0.5 percent sodium chloride. While still in the reverse osmosis cell, this membrane was exposed for 2 hours at 40 pounds per square inch to an aqueous solution containing 100 parts per million of poly(vinyl methyl ether) ("Gantrez" M-154). Subsequently the treated membrane had after one day a water flux of 10.4 gallons per square foot per day and a salt passage of only 18 percent and after 58 days a water flux of 8.8 gallons per square foot per day and a salt passage of only 16 percent with the same test solution and reverse osmosis conditions.

EXAMPLE XII

A reverse osmosis unit was assembled using hollow fiber membranes as described in Example IV. This unit, after 18 hours exposure to an aqueous solution containing 0.5 percent sodium chloride at 600 pounds per square inch, had a water permeation rate of 2.84 gallons per square foot per day and a salt passage of 1.33 percent with a "dead end" pressure of 161 pounds per square inch at a conversion of about 13 percent.

This unit was thoroughly flushed with an aqueous solution containing 100 parts per million of the product of the reaction of about four molecular proportions of ethylene oxide with sorbitan monolaurate ("Tween" 21, Atlas Chemical Industries) and the hollow fiber membranes were exposed to this solution for two hours at 40 pounds per square inch at ambient temperature. The unit was flushed with water and then the membranes were again exposed to an aqueous solution of sodium chloride under reverse osmosis conditions as described above. They had a water permeability of 2.52 gallons per square foot per day and a salt passage of only 0.833 percent with a "dead end" pressure of 144 pounds per square inch at a conversion of about 10 percent.

After one day the pressure on the feed solution was released over a week-end. When the pressure was again applied, the membranes had a water permeability of 2.49 gallons per square foot per day and a salt passage of only 0.717 percent with a "dead end" pressure of 145 pounds per square inch and a conversion of about 13.8 percent.

EXAMPLE XIII

A copolymer containing 2.5 percent sulfur was prepared by condensing a mixture of 70 parts of isophthaloyl chloride and 30 parts of terephthaloyl chloride with a substantially stoichiometric amount of a mixture of metaphenylenediamine and the calcium salt of metaphenylenediamine-4-sulfonic acid in dimethylacetamide solution, substantially as described by Magat in Example 10 of U.S. Pat. 3,184,436. Hollow fiber membranes were prepared from this polymer substantially as described in Example II.

A reverse osmosis unit containing a loop of 50 of these hollow fibers was assembled substantially as described in Example II. After about 18 hours exposure to an aqueous solution containing 0.5 percent sodium chloride at 600 pounds per square inch, these membranes had a water permeability of 4.07 gallons per square foot per day and a salt passage of 2.65 percent with a "dead end" pressure of 305 pounds per square inch at a conversion of about 8 percent.

This unit was thoroughly flushed with the treating solution of Example XII and the hollow fiber membranes were exposed to this solution for two hours at 40 pounds per square inch at ambient temperature. After flushing with water, the membranes were again exposed to the aqueous sodium chloride under reverse osmosis conditions as described above. They had a water permeability of 3.82 gallons per square foot per day and a salt passage of only 1.86 percent with a "dead end" pressure of 295 pounds per square inch at a conversion of about 8 percent. After four days they had a water permeability of 3.37 gallons per square foot per day and a salt passage of 1.92 percent with a "dead end" pressure of 295 pounds per square inch at a conversion of about 8.7 percent. After releasing the pressure on the feed solution for seven hours and again applying the pressure, they had a water permeability of 3.29 gallons per square foot per day and a salt passage of only 1.78 percent with a "dead end" pressure of 292 pounds per square inch at a conversion of about 8.6 percent.

EXAMPLE XIV

Hollow fiber reverse osmosis test units were assembled as described in Example VII. The reverse osmosis desalination properties of the membranes were determined with an aqueous sodium chloride solution containing 2000 parts per million of chloride ion at a pressure of 600 pounds per square inch. After about 20 hours the membranes had a water flux of 3.3 gallons per square foot per day and a salt passage of 1.5 percent at a conversion of about 10 percent and a "dead end" pressure of 175 pounds per square inch. After about 50 hours additional exposure of these membranes at 600 pounds per square inch to an aqueous solution containing 2000 parts per million of chloride ion as sodium chloride and also 10 parts per million of poly(vinyl methyl ether) ("Gantrez" M-154), these membranes had a water flux of 2.8 gallons per square foot per day and a salt passage of only 0.48 percent at a conversion of about 9 percent and a "dead end" pressure of 159 pounds per square inch. After an additional 12 days exposure at 600 pounds per square inch to the solution containing only 2000 parts per million of chloride ion, these membranes had a water flux of 2.2 gallons per square foot per day and a salt passage of only 0.36 percent at a conversion of about 8 percent and a "dead end" pressure of 146 pounds per square inch. Later, at a conversion of about 50 percent, these membranes had a water flux of 1.9 gallons per square foot per day and a salt passage of 1.03 percent at a "dead end" pressure of 134 pounds per square inch.

The embodiments of this invention in which an exclusive property or privilege is claimed are defined as follows:

1. A method for improving solute rejection efficiency of a permselective membrane of a substantially linear, aromatic synthetic organic, nitrogen-linked polymer having the formula $$-(L-R)_n-$$

wherein
(i) each —L— group as it occurs in the polymer chain is independently a linking group and at least about 50 percent of the —L— groups contain a nitrogen atom in the polymer chain, said —L—group containing at least one of each of the structures

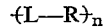

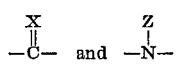

such that no one structure of either of these types is adjacent to more than one other structure of the same type, X being O, S or N and Z being H, $C_1$-$C_4$ alkyl or phenyl, said group

that results when X is N having the valence on N linked to an aromatic ring which is also separated from the

group in the polymer chain by an

structure linked to the aromatic ring at a position vicinal to the

group, thereby forming a benzimidazole structure as a linking group

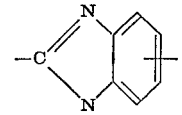

wherein Z is as defined above;
(ii) each —R— group as it occurs in the polymer chain is independently an organic radical and at least about 50 percent of the —R— groups consist essentially of a 5-member or a 6-member ring subject to resonance bonding, the 5- and 6-member rings being selected from the group consisting of monocarbocyclic, monoheterocyclic, fused carbocyclic, fused heterocyclic, and

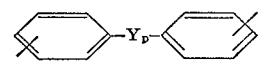

aromatic rings where Y is CO, O, S, $SO_2$, NH or lower alkylene and p is zero or one; and
(iii) the degree of polymerization is defined by n, an integer sufficiently large to provide film-forming molecular weight;

said method comprising contacting the membrane with an effective amount of an ether having a formula weight greater than 400 and a ratio of carbon atoms to oxygen atoms between about 2.5:1 and about 5:1.

2. The method of claim 1 wherein the ether is in aqueous solution when exposed to the membrane.

3. The method of claim 1 wherein the ether is of the formula

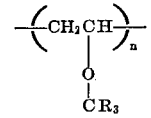

wherein
R is hydrogen, methyl or ethyl; and
n is a number of from about 8 to about 1000.

4. The method of claim 3 wherein n is between 100 and 1000, R is hydrogen, and the ratio of carbon atoms to oxygen atoms is about 3:1.

5. The method of claim 1 wherein the ether is one of the formula

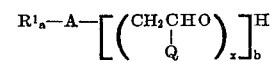

wherein $R^1$ is an aliphatic or aromatic radical;

R is $-O-$, $-S-$, $-NH-$, $$-\overset{O}{\underset{\|}{C}}-\overset{H}{\underset{|}{N}}-, \quad -PO_3= \quad \text{or} \quad -\overset{O}{\underset{\|}{C}}-O-$$

$x$ is a number sufficiently large to give a formula weight of more than 400;

Q is hydrogen or methyl; and $a$ and $b$ are one with the proviso that when A is $-PO_3-$ then $a$ is one or two and $b$ is one or two.

6. The method of claim 5 wherein the ether is one of the formula $$R^3_n-\langle\text{ring}\rangle-O-(CH_2CH_2O)_xH$$

wherein $R^3$ is a hydrocarbon radical;

$n$ is a number in the range 1 to 5 inclusive; and $x$ is a number sufficiently large to give a formula weight of more than 400.

7. The method of claim 5 wherein the membrane is exposed to water at a temperature in the range of about 50 to about 90° C. during or after its exposure to ether.

8. The method of claim 7 wherein the membrane is exposed to an aqueous solution of the ether at a temperature in the range of about 50 to about 90° C. for from about 2 to about 24 hours.

9. The method of claim 7 wherein the membrane is exposed to water at a temperature in the range of about 50 to about 90° C. after its exposure to ether.

10. A method for improving solute rejection efficiency of a permselective membrane of a substantially linear, aromatic, synthetic, organic, nitrogen-linked polymer having the formula $$+L-R+_n$$

wherein (i) each $-L-$ group as it occurs in the polymer chain is independently a linking group and at least about 50 percent of the $-L-$ groups contain a nitrogen atom in the polymer chain, said $-L-$ group containing at least one of each of the structures $$-\overset{X}{\underset{\|}{C}}- \quad \text{and} \quad -\overset{Z}{\underset{|}{N}}-$$

such that no one structure of either of these types is adjacent to more than one other structure of the same type, X being O, S or N and Z being H, $C_1$-$C_4$ alkyl or phenyl, said group $$-\overset{N-}{\underset{\|}{C}}-$$

that results when X is N having the valence on N linked to an aromatic ring which is also separated from the $$-\overset{N}{\underset{\|}{C}}-$$

group in the polymer chain by an $$-\overset{Z}{\underset{\|}{N}}-$$

structure linked to the aromatic ring at a position vicinal to the $$-\overset{N-}{\underset{\|}{C}}-$$

group, thereby forming a benzimidazole structure as a linking group $$-C\langle\text{benzimidazole}\rangle$$

wherein Z is as defined above;

(ii) each $-R-$ group as it occurs in the polymer chain is independently an organic radical and at least about 50 percent of the $-R-$ groups consist essentially of a 5-member or a 6-member ring subject to resonance bonding, the 5- and 6-member rings being selected from the group consisting of monocarbocyclic, monoheterocyclic, fused carbocyclic, fused heterocyclic, and $$\langle\text{ring}\rangle-Y_p-\langle\text{ring}\rangle$$

aromatic rings where Y is CO, O, S, $SO_2$, NH or lower alkylene and $p$ is zero or one; and (iii) the degree of polymerization is defined by $n$, an integer sufficiently large to provide film-forming molecular weight;

said method comprising contacting the membrane with an effective amount of an ether of the formula $$\left(R^6-\overset{O}{\underset{\|}{C}}-O\right)_p-Z-[(CH_2CH_2O)_nH]_q$$

wherein

Z is the residue of tetrahydropyran, tetrahydrofuran or condensed tetrahydrofuran;

$n$ is a number sufficiently large to give a formula weight of more than 400;

$R^6$ is a straight or branched-chain saturated or unsaturated aliphatic radical of 10 to 18 carbon atoms; and $p$ and $q$ are independently numbers from 1 to 3 inclusive with the proviso that the sum of $p$ and $q$ is equal to the number of esterified and etherified hydroxyl groups in Z.

11. The method of claim 3 wherein the polymer membrane is an aromatic polyamide, polyhydrazide or poly(amide-hydrazide).

12. The method of claim 11 wherein the ether is a poly(vinyl methyl ether).

References Cited

UNITED STATES PATENTS

| | | | |
|---|---|---|---|
| 3,329,557 | 7/1967 | Magat et al. | 264—49 |
| 3,710,945 | 1/1973 | Dismore | 264—41 |
| 3,373,056 | 3/1968 | Martin | 264—41 |
| 3,446,359 | 5/1969 | Loeb et al. | 264—49 |
| 27,319 | 3/1973 | Manjikian et al. | 264—41 |

DONALD E. CZAJA, Primary Examiner

G. R. MARSHALL, Assistant Examiner

U.S. Cl. X.R.

210—500